United States Patent [19]

Krohm et al.

[11] Patent Number: 5,772,716
[45] Date of Patent: Jun. 30, 1998

[54] METHOD FOR PYROLYTICALLY COATING GLASS, GLASS CERAMIC AND ENAMEL PRODUCTS

[75] Inventors: Hans-Günter Krohm, Raesfeld; Sven-Uwe Vallerien, Essen, both of Germany

[73] Assignee: Th. Goldschmidt AG, Essen, Germany

[21] Appl. No.: 529,941

[22] Filed: Sep. 18, 1995

[30] Foreign Application Priority Data

Sep. 17, 1994 [DE] Germany ............... 44 33 206.8

[51] Int. Cl.$^6$ .................................................. C03C 17/00
[52] U.S. Cl. ................. 65/60.2; 65/60.5; 65/60.52; 65/60.8; 427/160; 427/165; 427/168
[58] Field of Search ............... 65/60.2, 60.5, 65/60.52, 60.8; 427/160, 165, 168, 419.3, 419.4

[56] References Cited

U.S. PATENT DOCUMENTS

| | | | |
|---|---|---|---|
| 3,378,396 | 4/1968 | Zaromb | 428/428 |
| 4,187,336 | 2/1980 | Gordon | 428/34 |
| 4,386,117 | 5/1983 | Gordon | 427/109 |
| 5,028,566 | 7/1991 | Lagendijk | 437/238 |
| 5,085,805 | 2/1992 | Ruf | 65/60.5 |
| 5,089,039 | 2/1992 | Terneu | 65/60.5 |
| 5,102,691 | 4/1992 | Russo | 65/60.5 |
| 5,322,540 | 6/1994 | Jacquet | 65/60.5 |

FOREIGN PATENT DOCUMENTS

| | | |
|---|---|---|
| 0318486 | 6/1989 | European Pat. Off. . |
| 2246193 | 3/1973 | Germany . |
| 3915232 | 11/1990 | Germany . |
| 9312934 | 7/1993 | WIPO . |
| 9313393 | 7/1993 | WIPO . |

OTHER PUBLICATIONS

LPCVD of Borophosphosilicate Glass from Organic Reactants, by D.S. Williams (AT&T Bell Laboratories, Murray Hill, New Jersey 07974) and E.A. Dein (AT&T Bell Laboratories, Allentown, Pennsylvania 18103), J. Electrochem Soc.: Solid–State Science and Technology, 134, No.3 (Mar. 1987), 657–664.

Low Pressure Deposition of Doped $SiO_2$ by Pyrolysis of Tetraethylorthosilicate (TEOS), I. Boron and Phosphorus Doped Films, by F.S. Becker *Siemens AG, Company Project MEGA in Germany) and S. Röhl (Siemens AG, Microelectronics Technology Center in Germany), J. Electrochem Soc.: Solid–State Science and Technology, 134, No. 11(Nov. 1987), 2923–2931.

The LPCVD of Silicon Oxide Films below 400° C. from Liquid Sources, by A.K.Hochberg and D.L. O/Meara (J.C. Schumacher Company, Carlsbad, California 92009), J. Electrochem. Soc., 136, No. 6 (Jun. 1989), 1843 + 1844.

*Primary Examiner*—Timothy M. Speer
*Attorney, Agent, or Firm*—Anderson, Kill & Olick, P.C.

[57] ABSTRACT

Electrically conductive and infrared-reflecting tin oxide layers with a reduced optical irisation intensity on glass, glass ceramic and enamel are produced in that initially a solution of boron, silicon, tin and optionally phosphorus compounds in water and/or organic solvents is applied and converted pyrolytically into a layer of oxides of these elements, the refractive index of which lies between that of the substrate to be coated and that of the tin oxide layer and on this layer, a tin oxide layer is applied pyrolytically in a known manner.

5 Claims, No Drawings

METHOD FOR PYROLYTICALLY COATING GLASS, GLASS CERAMIC AND ENAMEL PRODUCTS

FIELD OF INVENTION

The invention relates to a method for producing pyrolytic layers on glass, glass ceramic and enamel and, at the same time, for reducing the optical irisation intensity of tin oxide layers. The invention also relates to a solution for the pyrolytic application of an irisation-lowering layer on glass, glass ceramic and enamel substrates as well as a glass, glass ceramic or an enamel substrate coated by the inventive method.

BACKGROUND INFORMATION AND PRIOR ART

The coating of substrates with tin oxides is well known. Such a procedure decreases the electrical resistance of the surface so coated and increases the infrared reflection. These physical properties are utilized industrially for thermal insulation glasswork or for 2-dimensional heating of window panes, such as those of automobiles, and for freezer counter glasswork.

To produce such layers, suitable tin compounds (basic compounds) are brought preferably simultaneously along with a doping agent into contact with the glass surface that has been heated to 400° to 800° C. The basic tin compound forms a coherent tin(IV) oxide layer on the surface of the glass, the glass ceramic or the enameling. Fluorine in particular is a doping agent, which increases the electrical conductivity and brings about a high infrared reflection. The spraying of suitable tin-and fluorine-containing solutions for applying fluorine-doped tin oxide layers on the surfaces is particularly simple. Examples of this are the German Offenlegungsschriften 22 46 193 and 39 15 232 and the EP-A-0 318 486. For example, organic solutions of the reaction products obtained from the reaction of trifluoroacetic acid with alkyl tin oxides are applied to the glass or ceramic surface, which has been heated to 400° to 700° C., in order to achieve an optimum surface resistance and IR reflection therewith (German Offenlegungsschrift 39 15 232). Moreover, organic solutions of monobutyl tin trichloride with tin(II) fluoride as doping agent can also be used (German Offenlegungsschrift 37 35 574).

Depending on the thickness of these semi-conducting layers, optical irisation colors are formed here by such a method. Various methods have been described in the literature for avoiding such effects.

In U.S. Pat. No. 3,378,396, a method is described, for which the refractive index of the layer is increased initially by means of a high silicon dioxide content and by continuously increasing the tin oxide content until finally pure tin oxide layers are attained. The refractive index, at the same time, changes from a value of 1.5 at the glass surface to 2.0 at the tin oxide/air interface. Silicon tetrachloride and tin tetrachloride are used for this purpose. This is technologically not satisfactory since a coating cannot be applied herewith or can be applied only at great expense and effort during the glass manufacturing process.

In U.S. Pat. No. 4,187,336, a method is described, for which one or several intermediate layers are vapor deposited between the glass substrate and the electrically conductive tin oxide layer with the help of an atmospheric CVD (Chemical Vapor Deposition) process. The intermediate layer contains silicon dioxide as a component; certain silanes such as dimethylsilanes, diethylsilanes, tetramethylsilanes and silicon halides are named as precursors. The layer-deposition rate of this method ranges from 10 to 20 Angstrom per second and is too slow for commercial use, for which far higher speeds are required.

In U.S. Pat. No. 4,386,117, a process is described for producing mixed silicon oxide/tin oxide layers for achieving selective or continuously changing refractive indexes. Technologically acceptable vapor deposition rates of about 100 Angstrom/second are achieved here. However, alkoxyperalkylsilanes, such as methoxypentamethyldisilane or dimethoxytetramethylsilane, are used as starting compounds; these substances are, however, difficult to handle and are commercially not available.

In U.S. Pat. No. 5,028,566, a method for achieving silicon dioxide layers on substrates is described, which is based on the use of tetraethyl orthosilicate (TEOS) or also of 2,4,6, 8-tetramethylcyclotetrasiloxane. The difficulties of doping the film with phosphorus and the controlled availability resulting from the low vapor pressure of TEOS at the low-pressure CVD are also presented.

In the literature, there are further descriptions for achieving a doped silicon dioxide layer by means of low-pressure CVD, for example, D. S. Williams and E. A. Dein, J. Electrochem. Soc. 134, 657–664, (1987) or F. S. Becker and S. Röhl, J. Electrochem. Soc. 134, 2923–2931, (1987). These publications deal with the preparation of borosilicate glass layers on substrates starting out from TEOS and trimethylborate, as well as from trimethylphosphite.

A method based on diethylsilanes is described by A. K. Hochberg and D. L. O'Meara, J. Electrochem. Soc. 136, 1843–1844, (1989). Methods for attaining mixed silicon oxide/tin oxide layers, which use monobutyl tin trichloride and TEOS as precursors and, as accelerators for the formation of the layers, organophosphites and organoborates, are described in the WO 93/12934 and the WO 93/13393. At atmospheric pressure and at a temperature of 200° C., vapor deposition rates of mixed silicon oxide/tin oxide layers of about 300 Angstrom/second can be achieved on glass. However, the high cost of the equipment is a disadvantage of this method, particularly with respect to keeping the conditions, under which the layers are formed, constant, since the components are applied in gaseous form and, for this purpose, four gas streams must be metered accurately and coordinated with one another.

There is therefore a need for a method which makes it possible in a simple way to produce tin oxide layers, which are largely free of irisation. Such a method is made available by the invention. For this method, a layer, which contains the oxides of the elements phosphorus, boron, silicon and tin as well as optionally phosphorus itself, is initially applied on the hot surface. This layer has a refractive index, which lies between that of the glass surface and the doped tin oxide layer.

Subsequently, in a second step, a tin-containing solution, such as monobutyl tin trichloride in ethanol with tin(II) fluoride as doping agent (German Auslegungsschrift 37 35 574)is sprayed onto the still hot or once again heated glass surface.

The glass surface, so finished, has a high infrared reflection at wavelengths ranging from 2 $\mu$m to 15 $\mu$m, as well as good surface conductivity. The technical functional values of the tin oxide layers so achieved are at least equivalent to those of coatings applied conventionally without an intermediate layer.

Surprisingly however, the glass panes showed a clearly decreased color intensity of the optical irisation and, at the same time, high functional values of the doped tin oxide layer.

OBJECT OF THE INVENTION

An object of the present invention is a method for producing electrically conductive and infrared-reflecting tin oxide layers on glass, glass ceramic and enamel substrates with a reduced optical irisation intensity:

Another object of the invention is a solution for the pyrolytic application of an irisation-lowering layer on glass, glass ceramic and enamel substrates. Yet another object of the invention is a glass, glass ceramic or an enamel substrate coated by the inventive method.

SUMMARY OF THE INVENTION

The inventive method is characterized in that initially a solution of boron, silicon, tin and optionally phosphorus compounds in water and/or organic solvents is applied onto the hot surface, which is to be coated, and is converted pyrolytically into a layer of oxides of these elements, the refractive index of which lies between that of the substrate to be coated and the tin oxide layer and on this layer, a tin oxide layer is applied pyrolytically in a known manner.

Preferably, a fluorine-doped tin oxide layer is used. In the first step, the layer preferably is applied at a thickness of 50 nm to 1.5 μm. For the two layers, a total thickness of 100 nm to 2 μm is advantageous.

Yet another object of the invention is a solution for the pyrolytic application of an irisation-lowering layer on glass, glass ceramic and enamel substrates consisting of 4–35 parts by weight of one or several silicon compounds, 1–27 parts by weight of one or several boron compounds, 8–43 parts by weight of one or several tin compounds, 0–35 parts by weight of one or several phosphorus compounds and 30–86 parts by weight of an organic solvent or solvent mixture and/or water.

The following are particularly suitable as silicon-containing compounds:

tetraethyl silicates, polydimethylsiloxanes with an average chain length of up to 100 monomer units as well as alkyl-modified derivatives as well as copolymers containing them, cyclic polydimethylsiloxanes, hexafluorosilicic acid or also mixtures of these compounds.

The following, for example, are suitable as boron-containing compounds:

boric acid, trimethyl borate, triethyl borate, tripropyl borate or tributyl borate, hexafluoroboric acid and mixtures of these compounds.

The following, for example, are suitable as tin-containing compounds:

tin tetrachloride, alkyl tin trichloride (such as monobutyl tin chloride), dialkyl tin dichloride (such as dibutyl tin dichloride), monoalkyl tin oxide (such as monobutyl tin oxide), dialkyl tin oxide (such as dibutyl tin oxide), monoalkyl tin tricarboxylate (monobutyl tin acetate), dialkyl tin dicarboxylates (such as dibutyl tin acetate), trialkyl tin carboxylate (tributyl tin acetate), aqueous, alcoholic or ketonic stannic(IV) acid sols or mixtures of the above-named tin-containing compounds.

As phosphorus compounds, the following, for example, are suitable:

phosphoric acid and its dialkyl and trialkyl esters (methyl, ethyl, butyl and octyl), orthophosphoric acid and its alkyl esters (methyl, ethyl, butyl and octyl), linear and cyclic polyphosphates, or also mixtures of the phosphorus-containing compounds named above.

The following come into consideration as organic solvents:

alcohols (methanol, ethanol, isopropanol, butanol), ketones (acetone, methyl ethyl ketone, methyl isobutyl ketone), esters (ethyl acetate, butyl acetate) and/or water.

When selecting the compounds, attention must be paid to the compatibility of the components with one another. The technical conditions, such as the spraying apparatus, glass temperature or production speed, determine the nature and concentration of the materials used in this primer solution.

Phosphorus compounds need not be used in every case. However, their addition is recommended if there is chemical compatibility. Unwanted chemical reactions are possible particularly in the case of dialkyl tin compounds. The presence of the phosphorus compound is desirable in order to obtain an optimum effect in attenuating the irisation but is not essential in every case.

The solution is prepared simply by mixing in a suitable stirred vessel and it is ensured that the solution does not heat up excessively and precipitates are not formed. Ideally, the temperature should be kept clearly below the boiling point of the solvent.

The proportions of the solvent components can vary within wide limits, as stated above. However, the components must be contained in each case in a sufficient amount in order to satisfy the requirements of the technical application. For example, it must be possible to meter and spray them.

The selection depends on the nature and composition of the substrate that is to be coated and on the technical coating conditions. The selection of the components for the spraying solution furthermore depends particularly on obtaining an intermediate layer of metal oxides from this solution, the refractive index of which lies between that of the substrate used and the doped tin oxide layer. For coating commercial soda lime glass, it is advisable to obtain a metal oxide intermediate layer with a refractive index of, for example, 1.65 to 1.72. When used with a fluorine-doped tin oxide layer, this ensures an optimum attenuation of the optical irisation.

Suitable solutions are, for example:

| | | |
|---|---|---|
| 1. | 11–18.5% | dibutyl tin diacetate, |
| | 12–8% | boric acid, |
| | 16.6–9.5% | Tegopren ® 5863 (a product of Th. Goldschmidt AG, a polyether polydimethylsiloxane copolymer), and |
| | 60.4–64% | ethanol. |
| 2. | 11–18.5% | dibutyl tin diacetate, |
| | 29.7–44.6% | tributyl borate, |
| | 4.8–8.3% | Tegiloxan ® 3 (a product of Th. Goldschmidt AG, a polydimethylsiloxane) and |
| | 54.5–28.6% | ethyl acetate. |
| 3. | 9.6–14.7% | butyl tin trichloride, |
| | 29.7–44.6% | tributyl borate, |
| | 16.6–9.5% | Tegopren ® 5863, and |
| | 44.1–31.2% | ethanol. |
| 4. | 9.6–14.7% | butyl tin trichloride, |
| | 12–8% | boric acid, |
| | 16.5–9.5% | Tegopren ® 5863, and |
| | | the remainder being water. |

To implement the inventive coating method, the inventive preparation is sprayed by spray atomization onto the previously heated surfaces. For this, the temperature of the substrate should be between 400° and 800° C., with the proviso that the temperature should be below the respective melting or softening temperature of the substrate. A thin layer of metal oxides of the metal components used is thus formed on the hot surface by oxidation and thermal decomposition and the solvent is evaporated or is decomposed.

In a subsequent step, a fluorine-doped tin-containing solution is then sprayed onto this primer layer in a known manner. A fluorine-doped, tin oxide, functional layer is then produced on this surface primer coating by pyrolysis. The thickness of these two coatings can be varied in each case between 100 nm and 2 $\mu$m by metering the amount of solutions sprayed on.

The layers, prepared by the inventive method, are distinguished by a high transparency for visible light (75 to 88%). The integral infrared reflection at wavelengths ranging from 2.5 to 15 $\mu$m varies from 50% to more than 80%.

For further clarification of the invention, the following examples are given, it is understood that these Examples are provided by way of illustration and not by way of limitation. The solutions are prepared fresh in each case, because precipitates may be formed in some solutions when they have been left standing for several days.

EXAMPLE 1

First solution (amount sprayed-15 mL):

11.3% dibutyl tin diacetate,
8.7% boric acid,
2.5% Tegiloxan ® 3 (a product of Th. Goldschmidt AG, a polydimethylsiloxane), and
77.5% methanol; and Second Solution (amount sprayed-5 mL)
Tego® EffectCoat OTN3-5 (a product of Th. Goldschmidt AG: a fluorine-doped organotin compound in alcoholic solution).

The solutions are heated on a flat glass pane (160 mm×180 mm×6 mm), which previously had been heated for 5 minutes at an oven temperature of about 700° C. and brought by means of lifting and turning equipment into a spray cabinet with an exhaust system.

The glass plate, coated immediately and subsequently in this manner with a Walther hand spray gun (nozzle diameter 0.8 mm, spraying pressure 1.5 bar, spraying distance about 35 cm) has the following values after it has cooled down:

| | |
|---|---|
| surface resistance: | 55 ohm/square |
| IR reflection: | 59% (integral reflection in the wavelength region from 2 $\mu$m to 15 $\mu$m) |
| Irisation attenuation: | 1 |

The suppression of the optical irisation colors is evaluated visually by inspection on dark cardboard and reflection. The evaluation is rated in six steps (1=very good, 2=good, up to 6=unsatisfactory).

EXAMPLE 2

First solution (amount sprayed-15 mL):

11.3% dibutyl tin diacetate,
8.7% boric acid,
5% Tegiloxan ® 3, and
75% methanol; and Second Solution (amount sprayed-5 mL)

Tego® EffectCoat OTN3-5.
Method of application is same as that for Example 1.

| | |
|---|---|
| Surface resistance: | 43 ohm/square |
| IR reflection: | 63% |
| Irisation attenuation: | 1 |

EXAMPLE 3

First solution (amount sprayed-15 mL):

11.3% dibutyl tin diacetate,
8.7% boric acid,
5% Tegopren ® 5863 (a product of Th. Goldschmidt AG, a polydimethylsiloxane polyether copolymer),
5% trimethyl phosphite, and
70% methanol; and Second Solution (amount sprayed-15 mL)

Tego® EffectCoat OTN3-5.
Method of application as for Example 1.

| | |
|---|---|
| Surface resistance: | 10 ohm/square |
| IR reflection: | 86% |
| Irisation attenuation: | 2 |

EXAMPLE 4

First solution (amount sprayed-15 mL):

6.2% dibutyl tin diacetate,
13.8% boric acid,
5% tetraethyl silicate, and
75% methanol; and Second Solution (amount sprayed-5 mL (a) or 10 mL(b))

Tego® EffectCoat OTN3-5
Method of application is same as that for Example 1.

| | |
|---|---|
| Surface resistance: | 46 ohm/square for (a) |
| | 23 ohm/square for (b) |
| IR reflection: | 53% for (a) |
| | 66% for (b) |
| Irisation attenuation: | 1 for (a) and also for (b) |

EXAMPLE 5

First solution (amount sprayed-15 mL):

11.3% dibutyl tin diacetate,
8.7% boric acid,
1% Tegiloxan ® 3, and
79% methanol; and Second Solution (amount sprayed-5 mL)
Tego® EffectCoat OTN3-5.
Method of application is same as that for Example 1.

| Surface resistance: | 49 ohm/square |
|---|---|
| IR reflection: | 59% |
| Irisation attenuation: | 1 |

EXAMPLE 6

First solution (amount sprayed-15 mL):

| 7% dibutyl tin diacetate, |
|---|
| 43% tributyl borate, |
| 5% Tegopren ® 5863, and |
| 45% methanol; and |

Second Solution (amount sprayed-15 mL)
Tego® EffectCoat OTN3-5
Method of application is same as that for Example 1.

| Surface resistance: | 10 ohm/square |
|---|---|
| IR reflection: | 88% |
| Irisation attenuation: | 1–2 |

EXAMPLE 7

First solution (amount sprayed-15 mL):

| 10% monobutyl tin trichloride, |
|---|
| 5% Tegopren ® 5863, |
| 8.7% dimethyl phosphite, |
| 3.3% boric acid, and |
| 63.3% ethanol; and |
| 9.7% water |

Second Solution (amount sprayed-15 mL)
Tego® EffectCoat OTN3-5.
Method of application is same as that for Example 1.

| Surface resistance: | 12 ohm/square |
|---|---|
| IR reflection: | 83% |
| Irisation attenuation: | 3 |

The following are comparison examples without a primer layer:

EXAMPLE 8

First solution

Second Solution (amount sprayed-15 mL)
Tego® EffectCoat OTN3-5.
Method of application is same as that for Example 1.

| Surface resistance: | 13 ohm/square |
|---|---|
| IR reflection: | 82% |
| Irisation attenuation: | 6 |

EXAMPLE 9

First solution

Second Solution (amount sprayed-8 mL)
Tego® EffectCoat OTN3-5.
Method of application is same as that for Example 1.

| Surface resistance: | 32 ohm/square |
|---|---|
| IR reflection: | 46% |
| Irisation attenuation: | 6 |

What is claimed is:

1. A method for producing electrically conductive and infrared-reflective tin oxide layers with reduced optical iridescence intensity on a substrate chosen from the group consisting of glass, glass ceramic and enamel substrates, comprising the steps of:

initially applying a solution of boron, silicon, tin and optionally phosphorus compounds in water, organic solvents or both on a surface of the substrate and converting pyrolytically the applied solution into a first layer of oxides of these elements, the refractive index of which lies between that of the substrate to be coated and a tin oxide layer formed in the subsequent step, and subsequently on this first layer, applying pyrolytically a second tin oxide layer.

2. The method of claim 1, wherein the first layer is applied at a thickness of 50 nm to 1.5 $\mu$m.

3. The method of claim 2, wherein the first and second layers are applied at a total thickness of 100 nm to 2 $\mu$m.

4. The method of claim 3, wherein the second tin oxide layer is applied in combination with a doping agent.

5. The method of claim 4, wherein the doping agent is a fluorine-containing compound.

* * * * *